(12) United States Patent
Selva Vera

(10) Patent No.: US 6,437,733 B1
(45) Date of Patent: Aug. 20, 2002

(54) METHOD OF PROCESSING MULTIPATH NAVIGATION SIGNALS IN A RECEIVER HAVING A PLURALITY OF ANTENNAS

(75) Inventor: Jesus Selva Vera, Gilching (DE)

(73) Assignee: Agence Spatiale Europeenne, Cedex (FR)

(*) Notice: Subject to any disclaimer, the term of this patent is extended or adjusted under 35 U.S.C. 154(b) by 0 days.

(21) Appl. No.: 09/659,579

(22) Filed: Sep. 11, 2000

(30) Foreign Application Priority Data

Sep. 17, 1999 (FR) .............................. 99 11662

(51) Int. Cl.[7] .............................. G01S 5/02; G01S 3/02; H04B 7/185
(52) U.S. Cl. .................................. 342/357.02; 342/453
(58) Field of Search ........................... 342/453, 357.02, 342/357.03, 357.12; 701/215

(56) References Cited

U.S. PATENT DOCUMENTS 5,359,521 A * 10/1994 Kyrtsos et al. ............. 701/215

FOREIGN PATENT DOCUMENTS

| WO | WO97/40398 | 10/1997 | |
| WO | WO98/05128 | 2/1998 | .......... H04B/1/707 |

* cited by examiner

Primary Examiner—Thomas H. Tarcza
Assistant Examiner—Fred H. Mull
(74) Attorney, Agent, or Firm—Sughrue Mion, PLLC

(57) ABSTRACT

A method of processing navigation signals for a satellite navigation system using a receiver. The receiver is provided with a plurality of antennas generating antenna signals corresponding to the reception of signals corresponding to direct paths and to reflected paths. The method advantageously uses: a) a preprocessing of each antenna signal so as to filter it by a matched filter and to take an average over the peaks of the filtered signals; b) a decomposition into singular values in order to make an estimation of a signal subspace from the filtered and averaged signals representative of the correlation peaks; and c) a search for the delays of the signals corresponding to direct paths and to reflected paths.

8 Claims, 3 Drawing Sheets

METHOD OF PROCESSING MULTIPATH NAVIGATION SIGNALS IN A RECEIVER HAVING A PLURALITY OF ANTENNAS

BACKGROUND OF THE INVENTION

Field of the Invention

The subject of the present invention is a multipath navigation signal processing method adapted to a receiver having a plurality of receiving antennas.

In a navigation receiver of the direct-sequence-code-division multiple-access and pseudo-range estimation type, the reflections which introduce a delay of less than one bit of a pseudorandom noise sequence (or "chip") are liable to introduce a large time error. In the case envisioned here, a receiver having a plurality of receiving antennas, the attenuation of the effects of these multiple paths depends on the number of antennas in the receiver since each antenna generates a linear combination between the direct signal and the signals corresponding to multiple paths, and this information can be used by an attenuation algorithm.

BACKGROUND

Conventionally, the term "channel" will refer to the signal coming from one antenna and a receiver will be called single-channel or multichannel depending on whether it has one or more antennas.

From a theoretical standpoint, the principle of maximum probability is used to estimate the time, and in particular the DDLLs (Digital Delay Lock Loops) constitute an approximation of this principle for a signal and a channel in white noise. The use of the principle of maximum probability results, in the case of the aforementioned reflections, in a nonlinear equation and the signal processing is correspondingly complicated thereby. MEDLLs (Multipath Estimating Delay Lock Loops) are a good example of this: they require at least twice as many correlators as the aforementioned DDLLs and to solve the nonlinear equations requires an appreciably longer time than the advance/delay correlation of a DDLL.

SUMMARY OF THE INVENTION

The MEDLL technique is described in particular in the article by Brian Townsend et al., entitled "L1 Carrier Phase Multipath Error Reduction Using MEDLL Technology", published in 1995 in "Proceedings of the Institute of Navigation GPS", pages 1539–1533, as well as in the article by Richard Van Nee et al., entitled "The Multipath Estimating Delay Lock Loop: Approaching Theoretical Accuracy Limits", published in 1994 in the journal IEEE, pages 246–251.

A technique for attenuating the multipath effects using the MEDLL technique is also described in the article by G. El Sayed et al., entitled "Design of GPS Receiver Code and Carrier Tracking Loops for Multipath Mitigation", published in 1998 in Proceedings of the 11th International Technical Meeting of the Institute of Navigation, Nashville, pages 1041 to 1052. This technique is applied only to a single signal and is therefore suitable only for a single-channel receiver.

In general, a DDLL loop correlates the input signal with a locally generated replica. The loop then chooses, among all the possible correlations, as one for each delay, that which is closest to the input signal. The distance between two correlations is conventionally measured using a vector, which results in the solution of a linear minimization problem.

The present invention is provided for achieving a similar formulation in the case of a multichannel receiver.

The invention thus relates to a method of processing navigation signals for a satellite navigation system using a receiver, characterized in that the receiver has a plurality of antennas generating signals representative of the reception of signals corresponding to direct paths and to reflected paths and in that it carries out a search for the delays of the signals corresponding to direct paths and to reflected paths by comparing them with reference signals corresponding to known delays.

One particularly advantageous embodiment of the invention relies on the notion that the input signals of the various channels cover the same vector subspace as the direct signals and the signals coming from reflections.

It is therefore possible to estimate this subspace and then to use the distance between the subspace and the local correlations in order to formulate the minimization problem.

The method is therefore characterized in that it comprises:

a) a preprocessing of each antenna signal so as to filter it, by a filter matched to the waveform of the navigation signals of said navigation system and to its spectrum spreading code, and to take an average over the peaks of the filtered signals;

b) a decomposition into singular values in order to make an estimation of a vector signal subspace S from the filtered and averaged signals representative of the correlation peaks;

c) a one-dimensional search for the delays of the signals corresponding to direct paths and to reflected paths, by seeking the delays corresponding to minima in the distance between locally generated mode vectors corresponding to reference signals, the delays of which are known, and the vectors of the subspace S.

Said decomposition into singular values is preferably carried out for samples located around a correlation peak and in which most of the energy of the signal is concentrated. It may employ detection of a discontinuity in the singular values in order to estimate the rank p of the subspace S of the signal.

The method may be characterized in that said one-dimensional search is carried out in an estimated delay timeslot in which signals corresponding to a direct path and signals corresponding to reflected paths can be found.

Said one-dimensional search may comprise:

$c_1$) a calculation in said delay timeslot of the inverse of the distance between the vectors of the subspace S and the locally generated mode vectors;

$c_2$) an estimation of the delays of the signals corresponding to a direct path and of the signals corresponding to reflected paths by choosing the delays corresponding to the mode vectors for which the values of said inverses of the distance are a maximum.

BRIEF DESCRIPTION OF THE DRAWINGS

The invention will be more clearly understood on reading the description which follows, given by way of example and in conjunction with the drawings in which.

DETAILED DESCRIPTION OF THE INVENTION

The technique mentioned above, which employs a maximum probability estimator, firstly filters the input signal by means of a filter matched to the code and then compares the correlations obtained with local replicas using a nonlinear equation. The unknowns in this equation are the complex signal amplitudes and the delays, which means that a practical implementation, such as MEDLL, can take several minutes and therefore can be used only for a differential GPS system.

The concept proposed within the context of the present invention makes it possible to replace the nonlinear minimization step and this can be applied to an arbitrary geometry of the array, provided that the number of signals incident on the array is less than the number of elements making up the array.

Figure 1:
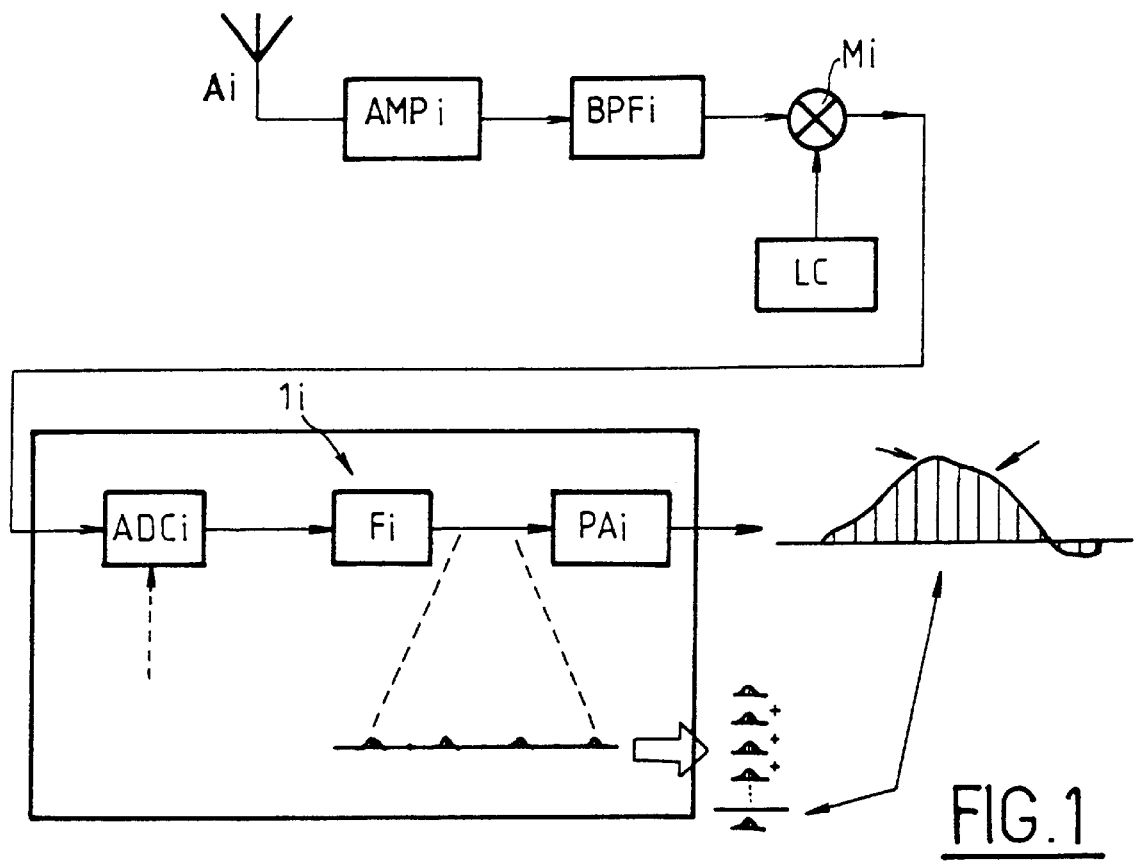
FIG. 1 illustrates the preprocessing.

According to the present invention (FIG. 1), the signals coming from N antennas $A_1, A_2, A_i \ldots A_N$ are all firstly, for the ith antenna $A_i$, amplified by a low-noise amplifier $AMP_i$, filtered by a band-pass filter $BPF_i$ and baseband transposed in a mixer $M_i$, one input of which receives for this purpose a local carrier LC. Next, in a preprocessing module $1_i$, they are digitized by an analog-digital converter $ADC_i$ and then filtered by a filter $F_i$ matched to the waveform of the pulses and to the spectrum spreading code. Such a filter is a finite impulse response (FIR) filter whose impulse response is obtained by sampling a window of the navigation signal, using more than one sample per pseudorandom signal bit (or chip) so that the waveform of the samples is reflected in the samples. Finally, it may be averaged in a step $PA_i$ for calculating the peak value average in order to deliver a preprocessed signal. According to this technique, the spreading-corrected peak signals which are output by the filter $F_i$ are processed by taking samples located about the estimated correlation peak and each of these samples is averaged for several correlation peaks so as to increase the signal/noise ratio.

The preprocessed signal relates only to a small number of samples located around the correlation peak, given that the energy of the signal is mainly in these samples.

Figure 2:
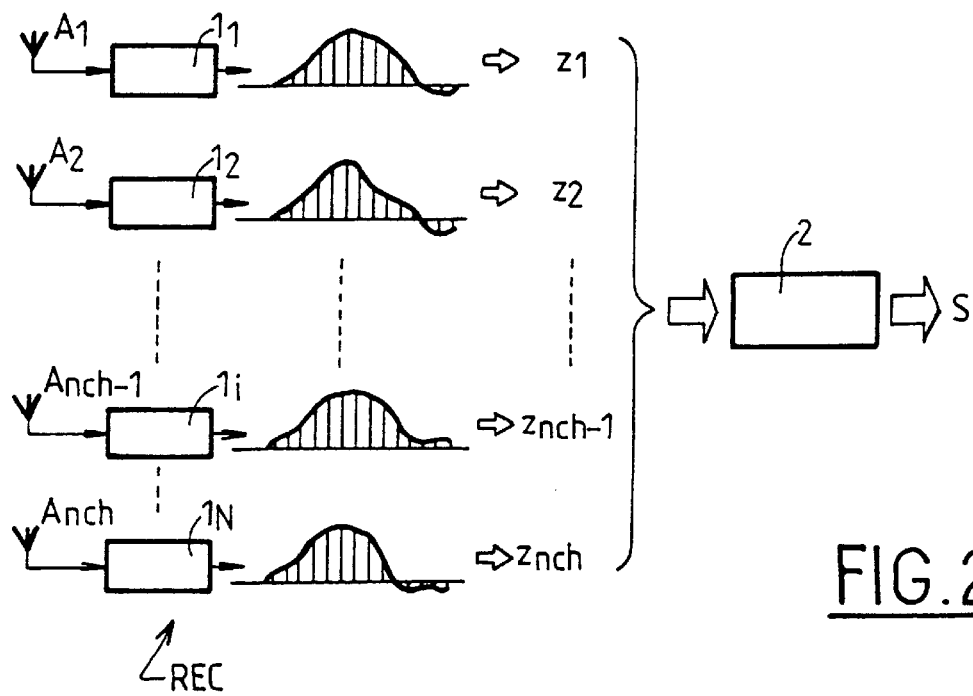
FIG. 2 illustrates the decomposition into singular values, applied after preprocessing in a multichannel receiver MCR.

As will be explained in greater detail in the rest of the description, the method of the invention then employs, in a module 2 (see FIG. 2), an estimation of the subspace S of the signal by decomposition into singular values of vectors $z_1, Z_2, \ldots, Z_{nch}$ formed from the samples of the correlation peaks of each of the nch antennas $A_1, A_2, \ldots, A_{nch-1}, A_{nch}$.

Figure 3:
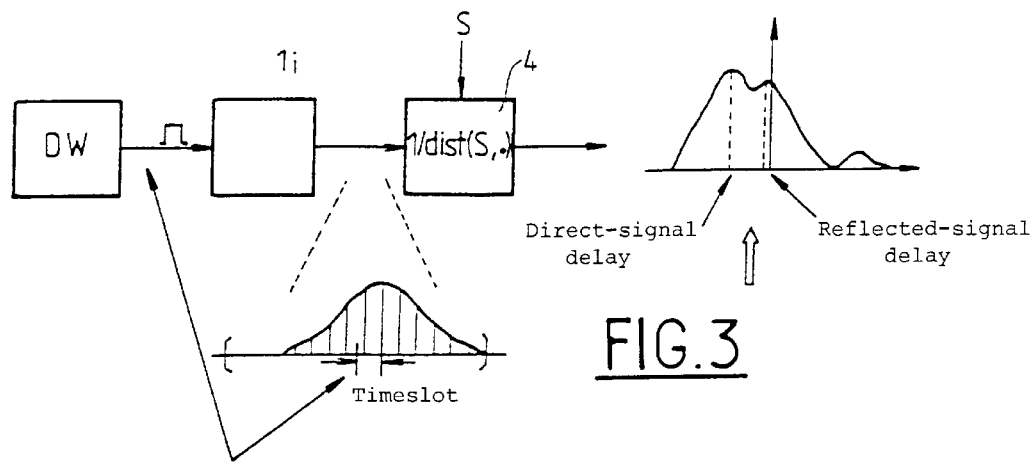
FIG. 3 illustrates the one-dimensional search.

Once the subspace S of the signal has been estimated, the method employs a one-dimensional search in a delay timeslot within which the direct signal and the signals coming from a reflection can lie (see FIG. 3). This timeslot may be obtained by a rough estimation employing a known technique such as the use of a conventional DDLL loop by means of a DW circuit. The reference preprocessing circuit $1_i$ locally generates mode vectors $z_i$ corresponding to noise-free incident signals having known given delays. The delay searches are carried out by seeking, by means of the module 2, those which are the closest mode vectors of the signal subspace S. The delays then value the delays corresponding to these closest mode vectors. The one-dimensional search may be carried out, for example, by calculating, in the delay timeslot, the inverse of the distance between the signal subspace S and each of the modes which are locally generated, the delays of the direct signals and of the signals that have undergone reflections then being able to be estimated in a module 4 by seeking the delay values for which the "inverse of the distance" function is a maximum.

The method according to the invention results, for a signal/noise ratio of a −20 dB C/A code (taken before the filter $F_i$) and for an integration time of only one second (i.e. approximately 1000 codes), in an error of the order of one hundredth of a bit of a pseudorandom noise sequence (1/100 of a chip), which is very much less than the result obtained with a DDLL loop ($\cong$5.6 hundredths of a bit).

The reasoning is based on a C/A code having shaped pulses ($\beta$=0.5).

The following notation is used:

$n_m$=number of modes;
$n_{ch}$=number of channels;
$n_L$=dimension of the space, that is to say the length of the vectors;
$(.)^T$=transpose of a matrix;
$(.)^H$=conjugate and transpose of a matrix;
$\lfloor a \rfloor$=largest integer less than or equal to $\underline{a}$;
a mod b=remainder of the division of a by b;
$<V_1, V_2, \ldots>=V_1, V_2, \ldots$ space;
$[V_1, V_2, \ldots]$=matrix formed by the column vectors $V_1, V_2 \ldots$;
rank [.]=rank of a matrix or of a subspace;
diag(.)=diagonal of a matrix;
min(.,.)=minimum; and
  tr(.)=sums of the diagonal elements of a matrix.

The model of a band-pass signal for the ith receiving channel is:

$$r_{bpi}(t) \equiv \sum_{k=1}^{n_m} \alpha_{ik} s(t-\tau_k)\cos(\omega t + \theta_{ik}) + n_{wbp}(t), i = 1, \ldots, n_{ch} \qquad (1)$$

where
s(t)=C/A code with shaped pulses;
$n_{wbp}(t)$=white band-pass noise;
$\alpha_{ik}$=actual amplitude;
$\theta_{ik}$=multipath phases.

The low-pass equivalent of $r_{bpi}(t)$ is:

$$r_i(t) \equiv \frac{1}{2}\sum_{k=1}^{n_m} \alpha_{ik} e^{j\theta_{ik}} s(t-\tau_k) + n_w(t) = \sum_{k=1}^{n_m} a_{ik} s(t-\tau_k) + n_w(t), \qquad (2)$$

$$i = 1, \ldots, n_{ch}$$

where:
$n_w(t)$=white noise $$a_{ik} \equiv \tfrac{1}{2}\alpha_{ik} e^{j\theta ik}\text{=multipath complex coefficients} \qquad (3)$$

$\tau_k$=multipath delays
$n_m$=number of multipath signals.

After sampling for a period $T_s$, N samples are available for each channel. Therefore:

$$r_i[n] \equiv \sum_{k=1}^{n_m} a_{ik} s[n, \tau_k] + n_w[n], i = 1, \ldots, n_{ch}, \qquad (4)$$

where:

$$s[n,\tau]=s(nT_s-\tau)\text{=reference signal} \qquad (5)$$

sampled with a delay $\tau$;

$n_w[n]$=sampled noise.

The values of $a_{ik}$ and of $\tau_k$, when N samples are available per channel, may be estimated using the maximum probability function, namely:

$$L \equiv -\sum_{i=1}^{n_{ch}}\sum_{m=0}^{N-1}\left|r_i[n-(N-1)+m] - \sum_{k=1}^{n_m} a_{ik}s[m,\tau_k]\right|^2 \quad (6)$$

The estimations of the amplitude $a_{i_1}k_1$ and of the delay $\tau R_1$ satisfy the following equations:

$$R_{rs,i_1}[n,\tau_{k_1}] - \sum_{k=1}^{n_m} a_{i_1 k} R_s(\tau_k, \tau_{k_1}) = 0, \quad (7)$$

$$i_1 = 1, \ldots, n_{ch}, k_1 = 1, \ldots, n_m,$$
and $$[\hat{\tau}_{k_1}, \ldots, \hat{\tau}_{n_m}] = \quad (8)$$

$$\operatorname*{argmin}_{[\tau_{k_1},\ldots,\tau_{n_m}]} \left\{ \sum_{i=1}^{n_{cn}} Re\left\{ a_{ik_1}\left(R_{rsj}[n,\tau_{k_1}] - \sum_{k=1,k=k_1}^{n_m} a_{ik} R_s(\tau_k, \tau_{k_1})\right)\right\}\right\}$$

in which equation $R_{rs,i}(n,\tau)$ and $R_s(\tau_1,\tau_2)$ are given by the following correlation formulae:

$$R_{rsj}[n,\tau] = \sum_{m=0}^{N-1} r_i[n-(N-t)+m]s[m|\tau] \quad (9)$$

(channel reference correlation)

$$R_s(\tau_1,\tau_2) \equiv R_s(\tau_2-\tau_1) = \sum_{m=0}^{N-1} s[m,\tau_1]s[m,\tau_2] \quad (10)$$

(reference autocorrelation).

The estimation is equivalent to making $n_m$ reference autocorrelations correspond to ns channel correlations, with complex amplitudes and different delays. The unknowns are only the delays, since the amplitudes can be obtained from (7) and replaced in (8). This results in nonlinear equations.

If $n_{ch}=1$, Equations (7) and (8) are the MEDLL equations [see the work by Richard Van Nee "Multi-transmitter Interference in Special Spectrum Communication and Navigation System", Delft University Press, The Netherlands, (1995)].

According to the invention, instead of making an estimation which makes the channel correlations correspond to reference correlations, resulting in nonlinear equations, an estimation of the subspace is made from the same correlations. Consequently, in both cases, the signals of the various channels must undergo a preprocessing in order to obtain the channel correlations.

Figure 4:
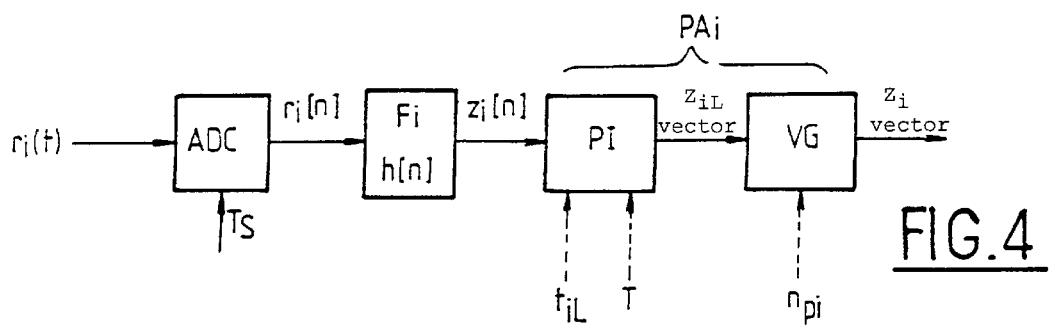
FIG. 4 illustrates a preferred preprocessing mode.

In particular, it is the few samples located near the correlation peaks which are of interest (see the circuit in FIG. 4).

In this circuit, the signal $r_i(t)$ of the ith channel is sampled at intervals $T_s$ in a sampling module $ADC_i$ and passes through the filter $F_i$ corresponding to the reference signal (a code period of $s(-\tau)$). The output $z_i[n]$ of the filter is given by:

$$z_i[n]=r_i*h[n] \quad (11)$$

where h[n] denotes the response of the matched filter.

Figure 5:
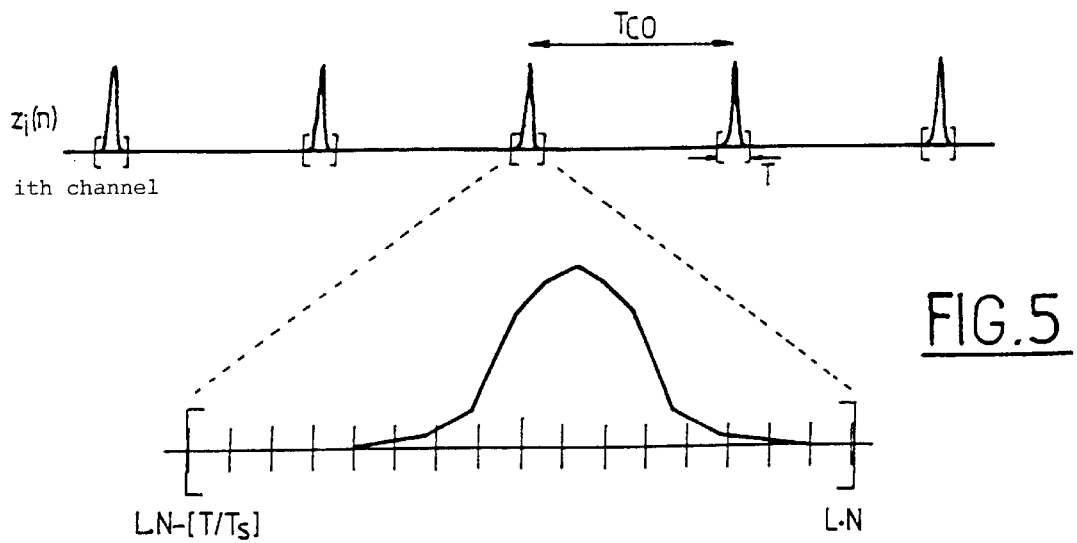
FIG. 5 shows the output of the matched filter $F_i$ for the ith channel.

The output signals $z_i[n]$ of the matched filter $F_i$ are illustrated in FIG. 5. Given that the level of the signals is high enough only for the samples located near the correlation peaks, only these are observed. It is possible for example, as indicated above, to determine approximately the position of the peaks and to choose a time reference $t_{iL}$ so that:

$t_{iL}=NT_s-T/2(L=1,\ldots,n_{pi}$, where $n_{pi}$ denotes the number of correlations peaks available for the ith channel).

T denotes the time interval around the correlation peaks. The circuit keeps only the samples located in the slot:

$$[NT_s-T, NT_s] \quad (12)$$

Since the duration of the interval T is known, the samples generated by the module PI and located in the $[t_{iL}-T/2,t_{iL}+T/2]$ slot constitute a vector $z_{iL}$:

$$z_{iL}=[z_i[LN-\lfloor T/T_s\rfloor],z_i[LN-\lfloor T/T_s\rfloor+1],\ldots|z_i[LN]]^T \quad (13)$$

These are samples around the Lth correlation peak.

Since the signal-to-noise ratio of these samples may prove not to be high enough, it is advantageous in this case to take an average over $n_{pi}$ correlation peaks in a module VG. In this way, what are called the channel vectors $z_i$ (with i between 1 and $n_{ch}$), also called $C_i$ (FIG. 2), are obtained. Thus:

$$z_i = \frac{1}{n_{pi}}\sum_{L=1}^{n_{pi}} z_{iL} \quad (14)$$

The channel vector is equivalent to the channel reference correlation of the maximum probability estimator according to Equation 9, given that:

$$(r_i = h)[n] = \sum_{k=-\infty}^{+\infty} h[k]r_i[n-k] = \sum_{k=0}^{N-1} s[N-k\cdot 0]r_i[n-k] \quad (15)$$

At the instant n=N—p, with p<<N, the output of the matched filter has the value:

$$(r_i = h)[N-p] = \sum_{k=0}^{N-1} s[N-k\cdot 0]r_i[N-p-k] \quad (16)$$

$$= \sum_{k=-p}^{N-1-p} s[N-k-p\cdot 0]r_i[N-k] \cong R_{rs}[N,pT_s]$$

Figure 6:
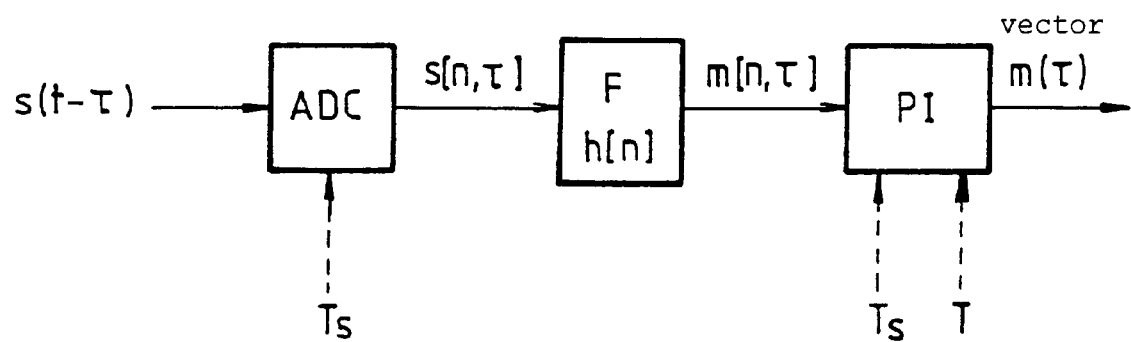
FIG. 6 illustrates the mode generation.

This estimation is also a function of the reference autocorrelation which can also be obtained by means of the circuit in FIG. 4 (without the module VG) by using $s(t-\tau)$ as input signal (see FIG. 6) and by dispensing with the averaging operation, since there is no noise. The outputs thus obtained, called modes (or mode vectors), are:

$$m[n,\tau]=(s[.,\tau]*h)[n] \quad (17)$$

(reference correlation);

$$m(\tau)=[m[\lfloor -T/2\rfloor+1,\tau]m[\lfloor -T/2\rfloor+2,\tau],\ldots m[\lfloor T/2|\tau]]^T\text{(modes)} \quad (18)$$

The modes $m(\tau)$ are equivalent to the reference autocorrelation (maximum probability) according to Equation (10) since:

$$(s[\therefore \tau] * h)[n] = \sum_{k=-\infty}^{+\infty} h[k]s[n-k, \tau] \quad (19)$$

$$= \sum_{k=0}^{N-1} s[N-k \cdot 0]s[n-k, \tau]$$

At the instant n=N–p, with p<<N, the output of the filter F is:

$$(s[\therefore \tau] * h)[N-p] = \sum_{k=0}^{N-1} s[N-k, \tau]s[N-p-k, \tau] \quad (20)$$

$$= \sum_{k=0}^{N-1} s[N-k, \tau]s[N+k, \tau+\rho T_s]$$

$$\cong R_s(\rho T_s)$$

As indicated above, the data processing for making an estimation using the principle of maximum probability according to Equation (8) is very complicated. The present method allows the solution of this problem to be considerably simplified by using a different concept which consists firstly in estimating the subspace in which most of the power of the signal is concentrated and then in seeking the closest modes (or mode vectors) by means of a one-dimensional search.

In the absence of noise, the channel vectors $Z_1, Z_2, \ldots zn_{nch}$ are linear combinations of the mode vectors $m_1, m_2, \ldots mn_m$.

The channel vectors and the mode vectors lie within the same subspace S=C, where:
S=<$m_1, m_2, \ldots mn_m$>(signal subspace)
C=<$z_1, z_2, \ldots zn_{ch}$>. (channel subspace).

Since the mode vectors are the values of a function at a parameter $m_i=m(\tau_i)$, where $i=1 \ldots n_m$, it is possible to determine the mode vectors intersecting the variety m(τ) with the channel subspace.

The following notation is used:
$n_L$=dimension of the space
$N=S^\perp=<n_1, n_2, \ldots, nn_L-n_m>$, noise subspace or subspace orthogonal to S;
m(τ), mode vectors as a function of the parameter τ
$m_i=m(\tau_i)$ modes, $i=1 \ldots, n_m$.

The channel vectors $z_1, z_2, \ldots, zn_{ch}$ are linear combinations of the modes, namely:

$$z_i = \sum_{k=1}^{n_m} a_{ik} m_k, i = \eta, \ldots, n_{ch} \quad (21)$$

$a_{ik}$ being constants.

The mode vectors may be obtained from the values of τ for which m(τ) is orthogonal to the subspace N, i.e.:

$$n^H_k \cdot m(\tau) = 0, k=1, \ldots n_L - n_m \quad (22)$$

When noise is present, the above method is not suitable given that the mode vectors lie in fact only within a subspace of the channel space. It is therefore necessary to find, from C, the subspace CS around which most of the energy is concentrated and then to apply the above parametric search method.

Let the matrix z=[$z_1, z_2, \ldots, zn_{ch}$]. The rank p of the matrix $H_p$ for which the sum of the squares of the elements of z—$H_p$ is a minimum is sought.

This condition may be reformulated in the following manner:

$$e^2 = tr((z-H_p)^H(z-H_p)) \quad (23)$$

This Equation (23) represents the square of the Frobenius norm applied to the matrix z—$H_p$.

The reader should refer to the work by Louis L. Scharf entitled "Statistical Signal Processing, Detection, Estimation and Time Series Analysis", page 45, published in 1991 by Addison-Wesley Publishing Company Inc.

The problem of how to minimize this norm is solved by applying a decomposition into singular values (Equation 24) which allows z to be expressed in the form:

$$z = U\Sigma V^H \quad (24)$$

U, being an orthogonal matrix with dimensions $n_L = n_{Ln}$, is a diagonal matrix with dimensions $n_L = n_{ch}$ and V is an orthogonal matrix with dimensions $n_{ch} = n_{ch}$. The diagonal elements of the matrix, which are called singular values, are positive or zero. They are classed by decreasing values:

$$\text{diag}(\Sigma) = [\lambda^2_1, \lambda^2_2, \ldots, \lambda^2_{min(n_L n_{ch})}] \quad (25)$$

The matrix $H_p$ may be expressed in the form:

$$H_p = U\Sigma_p V^H \quad (26)$$

U and V being given by (24).

Substituting the result of Equations (24) and (26) into Equation (23) and taking into account the fact that $UU^H = I$ and $VV^H = I$ gives:

$$\theta^2 = tr((z-H_p)^H(z-H_p)) = tr(V(\Sigma-\Sigma^H_p)U^H U(\Sigma-\Sigma_p)V^H)$$

$$tr(V(\Sigma-\Sigma^H_p)(\Sigma-\Sigma_p)V^H) = tr((\Sigma-\Sigma^H_p)(\Sigma-\Sigma_p)) \quad (27)$$

Since the matrix $H_p$ is of rank p, the error is minimal when $\Sigma_p$ is diagonal and cancels out the elements of its diagonal, the order of which is greater than $p_i$, namely:

$$\text{diag}(\Sigma_p) = [\lambda_1^2 \lambda^2_2, \ldots, \lambda^2_p, 0, 0, \ldots] \quad (28)$$

The rank for which this occurs may be evaluated by detecting a discontinuity in the rest of the singular values so that $\lambda^2_1, \lambda^2_2, \ldots,$ and $\lambda^2_p$ are of the same order of magnitude and that $\lambda^2_{p+1}, \lambda^2_{p+2}, \ldots,$ and $\lambda^2_{min(n_L n_{ch})}$ are very small.

This works only if the signal-to-noise ratio is better than 0 dB since:

$$\lambda^2_i = \lambda^2_{si} + \sigma^2_n, 1 \leq i \leq p$$

$$\lambda^2_i = \sigma^2_n, p+1 \leq i \leq min(n_s) \quad (29)$$

[lacuna] denoting the singular values of the signal and [lacuna] the variance of the noise (see the aforementioned work by Louis L. Scharf, pages 499–500).

The method may therefore be summarized in the following manner:

Decomposition of z into singular values:
$z = U\Sigma V^H$;

Detection of a discontinuity in the singular values and calculation therefrom of an estimated value of the rank p of the subspace;

The rank p is given by $z = U\Sigma_p V^H$ where $\Sigma_p$ contains only p diagonal elements.

If we write $U = [U_1 \ U_2]$, where $U_1$ contains the p first columns and $U_2$ the remaining $n_{L-p}$ columns, then <$U_1$> is the approximate subspace of rank ρ (signal subspace) and <$U_2$> is its orthogonal complement (noise subspace).

The parametric mode search is carried out using Equation (22) by calculating the value ρ for which:

$$m(\tau)^H U_2 = 0 \quad (30).$$

Given that the norm of Equation 30 is small, τ may be estimated by searching for the maxima of the inverse of the square of the norm, namely:

$$P(\tau) = \frac{1}{\|m(\tau)^H U_2\|^2} \quad \text{(delay spectrum)}. \quad (31)$$

The singular values will allow a distinction to be made between the signal subspace and the noise subspace. Once the subspace has been estimated, the parametric search detects the closest mode vectors.

The separation between the signal subspace $<U_1>$ and the noise subspace $<U_2>$ is detected by a discontinuity in the sequence of the singular values. This discontinuity can be detected by starting with the smallest singular value and by comparing the successive increments of these singular values with their mean increment and a discontinuity is regarded as being detected if its relative value is greater than a given threshold. This threshold may be chosen so as to correspond to a temporal error within the −25 to −20 dB range, this being a typical value for a C/A code. Such a criterion is particularly useful if, for a given mode, the number of channels is greater than the number of samples. In practice, it will be noted that it is preferable to overestimate (rather than underestimate) the number of singular values.

Once the subspace has been determined, the one-dimensional search is carried out in the manner explained above, thereby making it possible to determine the desired delays for the signals corresponding to a direct path and for those corresponding to paths having undergone reflections.

What is claimed is:

1. Method of processing navigation signals for a satellite navigation system using a receiver, wherein the receiver has a plurality of antennas generating antenna signals representative of received navigation signals corresponding to direct paths and to reflected paths, and the receiver carries out a search for the delays of the navigation signals corresponding to direct paths and to reflected paths by comparing the antenna signals with a vector signal subspace obtained from pre-processed antenna signals.

2. Method according to claim 1, wherein the method comprises:
   a) a preprocessing of each antenna signal so as to filter it, by a filter matched to the waveform of the navigation signals of said navigation system and to its spectrum spreading code, and to take an average over the peaks of the filtered signals;
   b) a decomposition into singular values in order to make an estimation of said vector signal subspace from the filtered and averaged signals representative of the correlation peaks;
   c) a one-dimensional search for said delays of the navigation signals corresponding to direct paths and to reflected paths, by seeking the delays corresponding to minima in the distance between locally generated mode vectors corresponding to said reference signals, the delays of which are known, and said vector signal subspace.

3. Method according to claim 2, wherein said decomposition into singular values is carried out for samples located around a correlation peak and around which most of the energy of the antenna signal is concentrated.

4. Method according to claim 3, wherein the decomposition into singular values employs detection of a discontinuity in the singular values in order to estimate the rank p of the subspace S of the antenna signal.

5. Method according to any one of the preceding claims, wherein said one-dimensional search is carried out in an estimated delay timeslot in which navigation signals corresponding to a direct path and navigation signals corresponding to reflected paths can be found.

6. Method according to claim 5, wherein said one-dimensional search comprises:
   $c_1$) a calculation in said delay timeslot of the inverse of the distance between the vectors of the vector signal subspace and the locally generated mode vectors;
   $c_2$) an estimation of the delays of the navigation signals corresponding to a direct path and of the navigation signals corresponding to reflected paths by choosing the delays corresponding to the mode vectors for which the values of said inverses of the distance are a maximum.

7. Method of processing navigation signals for a satellite navigation system using a receiver, wherein the receiver has a plurality of antennas generating antenna signals representative of received navigation signals corresponding to direct paths and to reflected paths and in that it carries out a search for the delays of the navigation signals corresponding to direct paths and to reflected paths by comparing the antenna signals with reference signals corresponding to known delays, wherein the method comprises the following steps:
   a) a preprocessing of each antenna signal so as to filter it, by a filter matched to the waveform of the navigation signals of said navigation system and to its spectrum spreading code, and to take an average over the peaks of the filtered signals;
   b) a decomposition into singular values in order to make an estimation of a vector signal subspace from the filtered and averaged signals representative of the correlation peaks;
   c) a one-dimensional search for said delays of the navigation signals corresponding to direct paths and to reflected paths, by seeking the delays corresponding to minima in the distance between locally generated mode vectors corresponding to said reference signals, the delays of which are known, and said vector signal subspace.

8. Method of processing navigation signals for a satellite navigation system using a receiver, wherein the receiver has a plurality of antennas generating antenna signals representative of the reception of navigation signals corresponding to direct paths and to reflected paths and in that it carries out a search for the delays of the signals corresponding to direct paths and to reflected paths by comparing the antenna signals with reference signals corresponding to known delays, and
   wherein said one-dimensional search is carried out in an estimated delay timeslot in which navigation signals corresponding to a direct path and navigation signals corresponding to reflected paths can be found.

* * * * *